United States Patent
Okuno et al.

(10) Patent No.: US 10,183,275 B2
(45) Date of Patent: Jan. 22, 2019

(54) TITANIUM OXIDE PARTICLE, METHOD FOR PRODUCING TITANIUM OXIDE PARTICLE, AND COMPOSITION FOR FORMING PHOTOCATALYST

(71) Applicant: FUJI XEROX CO., LTD., Tokyo (JP)

(72) Inventors: Hiroyoshi Okuno, Kanagawa (JP); Hideaki Yoshikawa, Kanagawa (JP); Yasunobu Kashima, Kanagawa (JP); Takeshi Iwanaga, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/679,476

(22) Filed: Aug. 17, 2017

(65) Prior Publication Data

US 2018/0280933 A1 Oct. 4, 2018

(30) Foreign Application Priority Data

Mar. 29, 2017 (JP) ................. 2017-065373

(51) Int. Cl.
*B01J 21/06* (2006.01)
*B01J 35/00* (2006.01)
*C09C 1/36* (2006.01)

(52) U.S. Cl.
CPC .......... *B01J 21/063* (2013.01); *B01J 35/004* (2013.01); *C09C 1/3607* (2013.01)

(58) Field of Classification Search
CPC ..... B01L 21/063; B01J 35/004; C09C 1/3607
See application file for complete search history.

(56) References Cited

U.S. PATENT DOCUMENTS

| | | | |
|---|---|---|---|
| 5,411,761 A | 5/1995 | Inokuchi et al. | |
| 5,919,422 A * | 7/1999 | Yamanaka | A61L 2/232 422/121 |
| 6,777,374 B2 * | 8/2004 | Sahle-Demessie | B01J 12/007 423/598 |
| 7,524,793 B2 * | 4/2009 | Orth-Gerber | C09C 1/3669 423/445 R |
| 7,615,512 B2 * | 11/2009 | Orth-Gerber | C09C 1/3669 423/445 R |
| 7,858,553 B2 * | 12/2010 | Scott | B82Y 30/00 423/335 |
| 7,887,779 B2 * | 2/2011 | Scott | B82Y 30/00 423/335 |
| 7,998,453 B2 * | 8/2011 | Scott | B82Y 30/00 423/335 |
| 9,394,623 B2 * | 7/2016 | Grimes | H01L 29/0665 |
| 9,604,198 B2 * | 3/2017 | Furudate | C09D 1/00 |
| 9,744,523 B2 * | 8/2017 | Idriss | B01J 23/52 |
| 9,833,776 B2 * | 12/2017 | Furudate | C01G 23/053 |
| 2008/0261805 A1 * | 10/2008 | Kanehira | A61K 33/24 502/159 |
| 2012/0060269 A1 * | 3/2012 | Tong | A47K 13/10 4/246.1 |
| 2012/0083409 A1 * | 4/2012 | Okuyama | B01J 21/063 502/309 |
| 2012/0270028 A1 * | 10/2012 | Orth-Gerber | C09C 1/3669 428/221 |
| 2013/0288055 A1 * | 10/2013 | Doshita | C01B 33/12 428/402 |
| 2017/0252724 A1 * | 9/2017 | Yoshikawa | B01J 21/08 |
| 2017/0252736 A1 * | 9/2017 | Hirose | B01J 21/063 |

FOREIGN PATENT DOCUMENTS

| | | |
|---|---|---|
| JP | H05-221640 A | 8/1993 |
| JP | 2001-269573 A | 10/2001 |
| JP | 2004-115541 A | 4/2004 |
| JP | 2007-016111 A | 1/2007 |
| JP | 2010-006629 A | 1/2010 |

* cited by examiner

*Primary Examiner* — Cam N. Nguyen
(74) *Attorney, Agent, or Firm* — Oliff PLC

(57) ABSTRACT

A titanium oxide particle includes a metal compound having a metal atom and a carbon atom and being bonded to a surface through an oxygen atom. The titanium oxide particle has absorption at a wavelength of 450 nm and a wavelength of 750 nm in a visible absorption spectrum and satisfies 0.03≤A≤0.3 where A represents a value of {(peak intensity of C—O bond+peak intensity of C=O bond)/(peak intensity of C—C bond+peak intensity of C=C bond)} in an XPS spectrum of a carbon 1s orbital.

16 Claims, No Drawings

TITANIUM OXIDE PARTICLE, METHOD FOR PRODUCING TITANIUM OXIDE PARTICLE, AND COMPOSITION FOR FORMING PHOTOCATALYST

CROSS-REFERENCE TO RELATED APPLICATIONS

This application is based on and claims priority under 35 USC 119 from Japanese Patent Application No. 2017-065373 Mar. 29, 2017.

BACKGROUND

Technical Field

The present invention relates to a titanium oxide particle, a method for producing a titanium oxide particle, and a composition for forming a photocatalyst.

SUMMARY

According to an aspect of the invention, there is provided a titanium oxide particle that includes a metal compound having a metal atom and a carbon atom and being bonded to a surface through an oxygen atom. The titanium oxide particle has absorption at a wavelength of 450 nm in a visible absorption spectrum and satisfies $0.03 \leq A \leq 0.3$ where A represents a value of {(peak intensity of C—O bond+peak intensity of C=O bond)/(peak intensity of C—C bond+peak intensity of C=C bond)} in an XPS spectrum of a carbon 1s orbital.

DETAILED DESCRIPTION

The exemplary embodiments of the invention will now be described. The descriptions and examples below are merely illustrative and do not limit the scope of the present invention.

In this disclosure, when the amount of any component in a composition is described and there are multiple substances that constitute that component in the composition, the amount of that component is the total amount of the substances that constitute the component unless otherwise noted.

In this disclosure, the term "step" refers not only to an independent step but also any step that may not be clearly distinguishable from other steps as long as the intended purpose of that step is achieved.

XPS stands for X-ray photoelectron spectroscopy.

Titanium Oxide Particle

A titanium oxide particle of an exemplary embodiment has a metal compound, which contains a metal atom and a carbon atom, bonded to its surface through an oxygen atom. In an XPS spectrum of the carbon 1s orbital taken from the titanium oxide particle, {(peak intensity of C—O bond+peak intensity of C=O bond)/(peak intensity of C—C bond+peak intensity of C=C bond)} is 0.03 or more and 0.3 or less. The titanium oxide particle has absorption at a wavelength of 450 nm in a visible absorption spectrum.

In this disclosure, the {(peak intensity of C—O bond+peak intensity of C=O bond)/(peak intensity of C—C bond+peak intensity of C=C bond)} in the XPS spectrum of the carbon 1s orbital is referred to as "XPS peak intensity ratio of the carbon 1s orbital". The XPS peak intensity ratio of the carbon 1s orbital is a parameter that indicates the degree of oxidation of the titanium oxide particle surface.

The XPS spectrum of the carbon 1s orbital is measured with an XPS system (for example, VERSAPROBE II produced by ULVAC-PHI, Inc.) by using a monochromated Al K-α radiation as an X-ray source, at a beam diameter of 100 μm, an output of 25 W and 15 kV, a take-off angle of 45°, a path energy of 23.5 eV, and a charge neutralization gun condition of 1.0 V/ion gun 10 V.

In an XPS spectrum of the carbon 1s orbital, multiple peaks appear depending on the bonding state of the carbon atoms, and assignment of the peaks is carried out according to the position of the chemical shift of each peak. In this exemplary embodiment, a peak appearing at 285.5 eV to 287 eV is assumed to be the peak of the C—O bond, a peak appearing at 287 eV to 288 eV is assumed to be the peak of the C=O bond, a peak appearing at 284 eV to 285.5 eV is assumed to be the peak of the C—C bond, and a peak appearing at 284.5 eV to 285 eV is assumed to be the peak of the C=C bond. The peak of the C—O bond and the peak of the C=O do not have to be separated. The higher one selected from the peak of the C—O bond and the peak of the C=O bond is assumed to be the (peak intensity of C—O bond+peak intensity of C=O bond), the higher one selected from the C—C bond and the peak of the C=C bond is assumed to be (peak intensity of C—C bond+peak intensity of C=C bond), and {(peak intensity of C—O bond+peak intensity of C=O bond)/(peak intensity of C—C bond+peak intensity of C=C bond)} is determined.

The titanium oxide particle of the exemplary embodiment exhibits high photocatalytic performance in a visible light range. The mechanism behind this is presumed to be as follows.

The titanium oxide particle of the exemplary embodiment is obtained by surface-treating a raw titanium oxide particle with a metal compound having a hydrocarbon group and performing a heat treatment to oxidize at least some of the hydrocarbon group into forming C—O or C=O bonds. While details of the mechanism are not clear, it is presumed that because a structure in which an organic metal compound having a carbon atom appropriately oxidized, an oxygen atom, and a titanium atom are sequentially ordered in a line through covalent bonds is present on the surface of the titanium oxide particle, the surface of the titanium oxide particle exhibits a light-absorbing property for the wavelengths of 450 nm and 750 nm, and the titanium oxide particle thereby exhibits responsiveness to visible light.

Presumably, when the XPS peak intensity ratio of the carbon 1s orbital is less than 0.03, the degree of oxidation of the organic metal compound is too low for the titanium oxide particle surface to exhibit a light-absorbing property in the visible light range.

In contrast, presumably, when the XPS peak intensity ratio of the carbon 1s orbital is more than 0.3, the heat treatment for oxidizing the organic metal compound is excessively intense, and not only oxidation but also disappearance of carbon atoms proceeds. Thus, the titanium oxide particle surface does not exhibit a sufficient light-absorbing property in the visible light range.

From the viewpoint of ease of developing the responsiveness to visible light, the organic metal compound bonded through oxygen atoms to the surface of the titanium oxide particle of the exemplary embodiment may be a metal compound composed of metal atoms, carbon atoms, hydrogen atoms, and oxygen atoms only.

From the viewpoint of ease of developing the responsiveness to visible light, the metal compound bonded through oxygen atoms to the surface of the titanium oxide particle of the exemplary embodiment may be bonded to the surface of the titanium oxide particle through oxygen atoms O directly bonded to the metal atoms M in the metal compound. In other words, the metal compound may be bonded to the surface of the titanium oxide particles through M—O—Ti covalent bonds.

From the viewpoint of ease of developing the responsiveness to visible light, the surface of the titanium oxide particle of the exemplary embodiment may be bonded to, through oxygen atoms, a metal compound that has a metal atom and a carbon atom directly bonded to the metal atom. It is presumed that when a structure (C—M—O—Ti) in which a carbon atom C, a metal atom M, an oxygen atoms O, and a titanium atom Ti are sequentially ordered in a line through covalent bonds is present on the surface of the titanium oxide particle and when the carbon atoms C are appropriately oxidized, the surface of the titanium oxide particle exhibits a light-absorbing property at wavelengths of 450 nm and 750 nm, and the titanium oxide particle exhibits responsiveness to visible light.

The metal atom that constitutes the organic metal compound bonded, through an oxygen atom, to the surface of the titanium oxide particle of the exemplary embodiment may be a metal atom selected from the group consisting of silicon, aluminum, and titanium, or may be a metal atom selected from the group consisting of silicon and aluminum. For example, a silicon atom may be used as the metal atom.

The titanium oxide particle of the exemplary embodiment also has the following advantages in addition to exhibiting a high photocatalytic performance in the visible light range.

In general, raw titanium oxide particles are less suitable for controlling the particle diameter, particle diameter distribution, and particle shape, and have a high tendency to aggregate. Thus, titanium oxide particles have low dispersibility in resin or liquid and tend to not exhibit the photocatalytic performance (1), to have low evenness in coating films formed of a coating solution prepared therefrom (2), and to form films with low transparency (3).

In contrast, the titanium oxide particle of the exemplary embodiment has a hydrocarbon group derived from the metal compound on the surface, and thus has good dispersibility. As a result, a substantially even coating film can be formed, light hits the titanium oxide particle efficiently, and the photocatalytic performance can be easily exhibited. Moreover, the transparency of the film or the like and evenness of the coating films formed of a coating solution are enhanced, and the designability is maintained. As a result, for example, when a paint containing titanium oxide particles is applied to a surface of an exterior wall material, a plate, a pipe, or a non-woven cloth (non-woven cloth of a ceramic or the like), aggregation of the titanium oxide particles occurs less, paint defects are reduced, and the photocatalytic performance tends to last for a long time.

The details of the titanium oxide particle of the exemplary embodiment will now be described.

The titanium oxide particle of the exemplary embodiment may be a titanium oxide particle obtained by surface-treating a raw titanium oxide particle with a metal compound that has a metal atom and a hydrocarbon group and performing a heat treatment to oxidize at least some of the hydrocarbon group. In this disclosure, the metal compound that has a metal atom and a hydrocarbon group is hereinafter simply referred to as a "metal compound having a hydrocarbon group".

Raw Titanium Oxide Particle

In this disclosure, the titanium oxide particle not yet subjected to a surface treatment with a metal compound having a hydrocarbon group is referred to as a "raw titanium oxide particle". Examples of the raw titanium oxide particle (titanium oxide particle to be surface-treated) include brookite, anatase, and rutile titanium oxide particles. The titanium oxide particle may have a single-crystal structure such as a brookite, anatase, or rutile structure, or a mixed-crystal structure in which these crystals co-exist.

The raw titanium oxide particle of the exemplary embodiment is a titanium oxide particle not yet surface-treated with a metal compound having a hydrocarbon group. Although other types of surface treatment are not excluded, the titanium oxide particle of the exemplary embodiment may be a titanium oxide particle surface-treated only with a metal compound having a hydrocarbon group.

The method for preparing the raw titanium oxide particle is not particularly limited. Examples of the method include a chlorine method (gas phase method) and a sulfuric acid method (liquid phase method).

One example of the chlorine method (gas phase method) is as follows. First, a raw material, rutile ore, is reacted with coke and chlorine to form titanium tetrachloride gas. The gas is then cooled to obtain liquid titanium tetrachloride. The liquid titanium chloride is then reacted with oxygen at high temperature to separate chlorine gas. As a result, raw titanium oxide is obtained.

One example of the sulfuric acid method (liquid phase method) is as follows. First, a raw material, ilmenite ore ($FeTiO_3$) or titanium slag, is dissolved in concentrated sulfuric acid to separate the iron component, which is an impurity, as iron sulfate ($FeSO_4$) and to obtain titanium oxysulfate ($TiOSO_4$). Next, titanium oxysulfate ($TiOSO_4$) is hydrolyzed so as to precipitate titanium oxyhydroxide ($TiO(OH)_2$). The resulting precipitates are washed and dried, and the dried precipitates are baked to obtain raw titanium oxide.

Other examples of the method for preparing the raw titanium oxide particle include a sol-gel method that uses titanium alkoxide, and a method that involves baking metatitanate. The crystal structure of the titanium oxide particle changes from brookite to anatase and to rutile as the baking temperature (for example, heating in the range of 400° C. to 1,200° C.) increases; thus, by adjusting the baking temperature, a titanium oxide particle of an intended crystal structure is obtained.

Metal Compound Having Hydrocarbon Group

The metal compound having a metal atom and a carbon atom and being present on the surface of the titanium oxide particle of the exemplary embodiment is derived from the metal compound having a hydrocarbon group used in the surface treatment of the titanium oxide particle.

The metal compound having a hydrocarbon group used in the surface treatment of the titanium oxide particle may be a metal compound that has a metal atom and a hydrocarbon group directly bonded to the metal atom. When two or more hydrocarbon groups are present in the metal compound having a hydrocarbon group, at least one of the hydrocarbon groups may be directly bonded to the metal atom of the metal compound.

Examples of the hydrocarbon group contained in the metal compound include saturated and unsaturated aliphatic hydrocarbon groups having 1 or more and 40 or less carbon atoms (the number of carbon atoms may be 1 or more and 20 or less, 1 or more and 18 or less, 4 or more and 12 or less, or 4 or more and 10 or less); and aromatic hydrocarbon groups having 6 or more and 27 or less carbon atoms (the number of carbon atoms may be 6 or more and 20 or less, 6 or more and 18 or less, 6 or more and 12 or less, or 6 or more and 10 or less).

The hydrocarbon group may be an aliphatic hydrocarbon group from the viewpoints of developing high photocatalytic performance and improving dispersibility. The aliphatic hydrocarbon group may be a saturated aliphatic hydrocarbon group. The saturated aliphatic hydrocarbon group may be an alkyl group. The aliphatic hydrocarbon group may be straight-chain, branched-chain, or cyclic. From the viewpoint of dispersibility, the aliphatic hydrocarbon group may be straight-chain or branched-chain.

The metal atom of the metal compound having a hydrocarbon group may be a metal atom selected from the group consisting of silicon, aluminum, and titanium, or may be a metal atom selected from the group consisting of silicon and aluminum. The metal atom may be, for example, silicon. In other words, the metal compound having a hydrocarbon group may be a silane compound having a hydrocarbon group. Examples of the silane compound having a hydrocarbon group include chlorosilane compounds, alkoxysilane compounds, and silazane compounds (hexamethyldisilazane and the like).

The silane compound having a hydrocarbon group used in the surface treatment of the titanium oxide particle may be a compound represented by general formula (1): $R^1{}_nSiR^2{}_m$ from the viewpoints of developing high photocatalytic performance and improving dispersibility.

In general formula (1): $R^1{}_nSiR^2{}_m$, $R^1$ represents a saturated or unsaturated aliphatic hydrocarbon group having 1 or more and 20 or less carbon atoms or an aromatic hydrocarbon group having 6 or more and 20 or less carbon atoms, $R^2$ represents a halogen atom or an alkoxy group, n represents an integer of 1 or more and 3 or less, and m represents 1 or more and 3 or less provided that n+m=4. When n represents an integer of 2 or 3, multiple groups represented by $R^1$ may be the same or different from each other. When m represents an integer of 2 or 3, multiple groups represented by $R^2$ may be the same or different from each other.

The aliphatic hydrocarbon group represented by $R^1$ may be straight-chain, branched-chain, or cyclic. From the viewpoint of dispersibility, the aliphatic hydrocarbon group may be straight-chain or branched-chain. The number of carbon atoms in the aliphatic hydrocarbon group may be 1 or more and 20 or less, 1 or more and 18 or less, 4 or more and 12 or less, or 4 or more and 10 or less from the viewpoints of developing high photocatalytic performance and improving dispersibility. The aliphatic hydrocarbon group may be saturated or unsaturated. From the viewpoints of developing high photocatalytic performance and improving dispersibility, the aliphatic hydrocarbon may be a saturated aliphatic hydrocarbon group, and the saturated aliphatic hydrocarbon may be an alkyl group.

Examples of the saturated aliphatic hydrocarbon group include straight-chain alkyl groups (a methyl group, an ethyl group, a propyl group, a butyl group, a pentyl group, a hexyl group, a heptyl group, an octyl group, a nonyl group, a decyl group, a dodecyl group, a hexadecyl group, and an icosyl group), branched-chain alkyl groups (an isopropyl group, an isobutyl group, an isopentyl group, a neopentyl group, a 2-ethylhexyl group, a tertiary butyl group, a tertiary pentyl group, and an isopentadecyl group), and cyclic alkyl groups (a cyclopropyl group, a cyclopentyl group, a cyclohexyl group, a cycloheptyl group, a cyclooctyl group, a tricyclodecyl group, a norbornyl group, and an adamantyl group).

Examples of the unsaturated aliphatic hydrocarbon group include alkenyl groups (a vinyl group (ethenyl group), a 1-propenyl group, a 2-propenyl group, a 2-butenyl group, a 1-butenyl group, a 1-hexenyl group, a 2-dodecenyl group, and a pentenyl group), and alkynyl groups (an ethynyl group, a 1-propynyl group, a 2-propynyl group, a 1-butynyl group, a 3-hexynyl group, and a 2-dodecynyl group).

The aliphatic hydrocarbon group may be a substituted aliphatic hydrocarbon group also. Examples of the substituent that can substitute the aliphatic hydrocarbon group include a halogen atom, an epoxy group, a glycidyl group, a glydoxy group, a mercapto group, a methacryloyl group, and an acryloyl group.

The aromatic hydrocarbon group represented by $R^1$ may have 6 or more and 20 or less carbon atoms, 6 or more and 18 or less carbon atoms, 6 or more and 12 or less carbon atoms, or 6 or more and 10 or less carbon atoms.

Examples of the aromatic hydrocarbon group include a phenylene group, a biphenylene group, a terphenylene group, a naphthalene group, and an anthracene group. The aromatic hydrocarbon group may be a substituted aromatic hydrocarbon group also. Examples of the substituent that can substitute the aromatic hydrocarbon group include a halogen atom, an epoxy group, a glycidyl group, a glydoxy group, a mercapto group, a methacryloyl group, and an acryloyl group.

Examples of the halogen atom represented by $R^2$ include a fluorine atom, a chlorine atom, a bromine atom, and an iodine atom. The halogen atom may be a chlorine atom, a bromine atom, or an iodine atom.

Examples of the alkoxy group represented by $R^2$ include alkoxy groups having 1 or more and 10 or less carbon atoms (or 1 or more and 8 or less, or 3 or more and 8 or less carbon atoms). Examples of the alkoxy group include a methoxy group, an ethoxy group, an isopropoxy group, a t-butoxy group, an n-butoxy group, an n-hexyloxy group, a 2-ethylhexyloxy group, and a 3,5,5-trimethylhexyloxy group. The alkoxy group may be a substituted alkoxy group also. Examples of the substituent that can substitute the alkoxy group include a halogen atom, a hydroxyl group, an amino group, an alkoxy group, an amide group, and a carbonyl group.

From the viewpoints of developing high photocatalytic performance and improving dispersibility, the compound represented general formula (1): $R^1{}_nSiR^2{}_m$ may have $R^1$ representing a saturated aliphatic hydrocarbon group. In particular, the compound represented by general formula (1): $R^1{}_nSiR^2{}_m$ may have $R^1$ representing a saturated aliphatic hydrocarbon group having 1 or more and 20 or less carbon atoms, $R^2$ representing a halogen atom or an alkoxy group, n representing an integer of 1 or more and 3 or less, and m representing an integer of 1 or more and 3 or less provided that n+m=4.

Examples of the compound represented by general formula (1): $R^1{}_nSiR^2{}_m$ include silane compounds such as these: vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (examples of the compounds with n=1 and m=3); dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane (examples of the compounds with n=2 and m=2); trimethylmethoxysilane, trimethylethoxysilane, trimethylchlorosilane, decyldimethylchlorosilane, and triphenylchlorosilane (examples of the compounds with n=3 and m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl) aminopropyltrimethoxysilane, γ-(2-aminoethyl) aminopropylmethyldimethoxysilane, and γ-glycidyloxypropylmethyldimethoxysilane (examples of the compounds with $R^1$ representing a substituted aliphatic hydrocarbon group or a substituted aromatic hydrocarbon group). These silane compound may be used alone or in combination.

From the viewpoints of developing high photocatalytic performance and improving dispersibility, the hydrocarbon group in the silane compound represented by general formula (1) may be an aliphatic hydrocarbon group. The aliphatic hydrocarbon group may be a saturated aliphatic hydrocarbon group, and the saturated aliphatic hydrocarbon group may be an alkyl group. From the viewpoints of developing high photocatalytic performance and improving dispersibility, the hydrocarbon group in the silane compound may be a saturated aliphatic hydrocarbon group having 1 or more and 20 or less carbon atoms, a saturated aliphatic hydrocarbon group having 1 or more and 18 or less carbon atoms, a saturated aliphatic hydrocarbon group having 4 or more and 12 or less carbon atoms, or a saturated aliphatic hydrocarbon group having 4 or more and 10 or less carbon atoms.

Examples of the silane compounds other than those represented by general formula (1) include tetramethoxysilane and tetraethoxysilane.

Examples of the metal compound having a hydrocarbon group and having aluminum as the metal atom include alkyl aluminate such as triethoxyaluminum, tri-i-propoxyaluminum, and tri-sec-butoxyaluminum; aluminum chelates such as di-i-propoxy•mono-sec-butoxyaluminum and di-i-propoxyaluminum•ethyl acetoacetate; and aluminate-based coupling agents such as acetoalkoxyaluminum diisopropylate.

Examples of the metal compound having a hydrocarbon group and having titanium as the metal atom include titanate-based coupling agents such as isopropyl triisostearoyl titanate, tetraoctyl bis(ditridecyl phosphite)titanate, and bis(dioctyl pyrophosphate) oxyacetate titanate; and titanium chelates such as di-i-propoxy bis(ethylacetoacetato) titanium, di-i-propoxy bis(acetylacetonate) titanium, di-i-propoxy bis(triethanolaminato) titanium, di-i-propoxytitanium diacetate, and di-i-propoxytitanium dipropionate.

The metal compounds each having a hydrocarbon group may be used alone or in combination.

Properties of Titanium Oxide Particle

The titanium oxide particle of the exemplary embodiment may have {(peak intensity of C—O bond+peak intensity of C═O bond)/(peak intensity of C—C bond+peak intensity of C═C bond)} of 0.03 or more and 0.3 or less, 0.04 or more and 0.25 or less, or 0.05 or more and 0.2 or less in an XPS spectrum of a carbon 1s orbital from the viewpoint of responsiveness to visible light.

The XPS peak intensity ratio of the carbon 1s orbital can be controlled within the aforementioned range by adjusting the temperature, time, and oxygen atmosphere during the heat treatment step in a method for producing a titanium oxide particle described below.

The titanium oxide particle of the exemplary embodiment has absorption at a wavelength of 450 nm and a wavelength of 750 nm in the visible absorption spectrum.

From the viewpoint of developing high photocatalytic performance in the visible light range, the titanium oxide particle of the exemplary embodiment may have absorption at wavelengths of 450 nm, 600 nm, and 750 nm in the visible absorption spectrum. The titanium oxide particle may have absorption throughout the entire wavelength range of from 450 nm to 750 nm or the entire wavelength range of from 400 nm to 800 nm, in the visible absorption spectrum.

From the viewpoint of developing high photocatalytic performance in the visible light range, the titanium oxide particle of the exemplary embodiment may have an absorbance of 0.02 or more (or 0.1 or more or 0.2 or more) at a wavelength of 450 nm, an absorbance of 0.02 or more (or 0.1 or more or 0.2 or more) at a wavelength of 600 nm, and an absorbance of 0.02 or more (or 0.1 or more or 0.2 or more) at a wavelength of 750 nm all relative to an absorbance of 1 at a wavelength of 350 nm in an ultraviolet-visible absorption spectrum.

The ultraviolet-visible absorption spectrum is obtained by the following method. The titanium oxide particle to be measured is dispersed in tetrahydrofuran, and the resulting dispersion is applied to a glass substrate and dried in air at 24° C. A diffuse reflectance spectrum in the wavelength range of from 200 nm to 900 nm is measured by using a spectrophotometer (for example, U-4100 manufactured by Hitachi High-Technologies Corporation, scan speed: 600 nm, slit width: 2 nm, sampling interval: 1 nm) by employing a diffuse reflectance measurement mode. From the diffuse reflectance spectrum, absorbance at each wavelength is theoretically obtained through Kubelka-Munk transformation to obtain an ultraviolet-visible absorption spectrum.

The volume-average particle diameter of the titanium oxide particle of the exemplary embodiment may be 10 nm or more and 1 μm or less, 10 nm or more and 200 nm or less, or 15 nm or more and 200 nm or less. When the volume-average particle diameter of the titanium oxide particle is 10 nm or more, the titanium oxide particle rarely aggregates, and the photocatalytic performance may be enhanced. When the volume-average particle diameter of the titanium oxide particle is 1 μm or less, the ratio of the specific surface area relative to the quantity is increased, and the photocatalytic performance tends to be enhanced. Thus, when the volume-average particle diameter of the titanium oxide particle is within this range, a high photocatalytic performance can be easily developed in the visible light range.

The volume-average particle diameter of the titanium oxide particle is measured with a dynamic light-scattering particle size analyzer (for example, Nanotrac UPA-ST manufactured by Microtrac Bell Co., Ltd.). The measurement conditions are set to a sample concentration of 20% and a measurement time of 300 seconds. The dynamic light-scattering particle size analyzer measures the particle diameter through the Brownian motions of the dispersoid. In particular, a laser beam is applied to the solution, and the particle diameter is measured by detecting the scattered light. On the basis of the particle size distribution measured by the dynamic light-scattering particle size analyzer, cumulative distribution of the volume of each particle is plotted from the small-diameter side relative to the divided particle size ranges (channels). Then the particle diameter at a cumulative 50% is assumed to be the volume-average particle diameter.

Method for Producing Titanium Oxide Particle

The titanium oxide particle of the exemplary embodiment may be produced by any method. The method may include a step of surface-treating a raw titanium oxide particle with a metal compound having a hydrocarbon group, and a step of a heat treatment performed during or after the step of surface-treating the raw titanium oxide particle.

Surface Treatment Step

The method for surface-treating the raw titanium oxide particle with a metal compound having a hydrocarbon group may be any. Examples of the method include a method that involves bringing a metal compound having a hydrocarbon group into direct contact with a raw titanium oxide particle; and a method that involves bringing a treatment solution, which is prepared by dissolving a metal compound having a hydrocarbon group in a solvent, into contact with a raw titanium oxide particle. Specifically, for example, the method may involve preparing a dispersion by dispersing the raw titanium oxide particle in a solvent and adding thereto a metal compound having a hydrocarbon or a treatment solution of the metal compound while stirring; or the method may involve adding (dropping, spraying, etc.) a metal compound having a hydrocarbon group or a treatment solution of the metal compound to a raw titanium oxide particle in a flowing state by being stirred in, for example, a HENSCHEL mixer or the like. By performing these methods, the reactive group (for example, a hydrolysable group such as a halogeno group or an alkoxy group) in the metal compound having a hydrocarbon group reacts with a hydroxyl group on the surface of the raw titanium oxide particle, and the raw titanium oxide particle becomes surface-treated.

Examples of the solvent that dissolves the metal compound having a hydrocarbon group include organic solvents (for example, hydrocarbon-based solvents, ester-based solvents, ether-based solvents, halogen-based solvents, and alcohol-based solvents), water, and any mixed solvent containing any combination of these. Examples of the hydrocarbon-based solvents include toluene, benzene, xylene, hexane, octane, hexadecane, and cyclohexane. Examples of the ester-based solvents include methyl acetate, ethyl acetate, isopropyl acetate, and amyl acetate. Examples of the ether-based solvents include dibutyl ether and dibenzyl ether. Examples of the halogen-based solvents include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol-based solvents include methanol, ethanol, and i-propyl alcohol. Examples of the water include tap water, distilled water, and pure water. Other examples of the solvent include dimethylformamide, dimethylacetamide, dimethyl sulfoxide, acetic acid, and sulfuric acid.

The concentration of the metal compound having a hydrocarbon in a treatment solution prepared by dissolving the metal compound having a hydrocarbon group in a solvent may be 0.05 mol/L or more and 500 mol/L or less or may be 0.5 mol/L or more and 10 mol/L or less.

From the viewpoints of developing high photocatalytic performance and improving dispersibility, the conditions for surface-treating the titanium oxide particle with a metal compound having a hydrocarbon may be as follows. The raw titanium oxide particle may be surface-treated with 10% by mass or more and 100% by mass or less (or 20% by mass or more and 75% by mass or less, or 25% by mass or more and 50% by mass or less) of the metal compound having a hydrocarbon group relative to the raw titanium oxide particle. When the amount of the metal compound having a hydrocarbon group is 10% by mass or more, a high photocatalytic performance can be easily exhibited in the visible light range, and the dispersibility is also enhanced. When the amount of the metal compound having a hydrocarbon group is 100% by mass or less, the amount of metal derived from the metal compound having a hydrocarbon group present on the surface of the titanium oxide particle is suppressed from being excessive, and degradation of the photocatalytic performance caused by excessive metal is suppressed.

The temperature at which the raw titanium oxide particle is surface-treated with a metal compound having a hydrocarbon group may be 15° C. or higher and 150° C. or lower, or 20° C. or higher and 100° C. or lower. The time for the surface treatment is 10 minutes to 120 minutes, or 30 minutes to 90 minutes.

After surface-treating the raw titanium oxide particle with the metal compound having a hydrocarbon group, a drying treatment may be performed. The drying treatment may be any process, for example, a known technique such as a vacuum drying technique or a spray drying technique. The drying temperature may be 20° C. or higher and 150° C. or lower.

Heat Treatment Step

The heat treatment is performed during or after the step of surface-treating the raw titanium oxide particle.

The heat treatment can be performed while surface-treating the raw titanium oxide particle with a metal compound having a hydrocarbon group, while performing a drying treatment after the surface treatment, or separately after the drying treatment. In order to cause the titanium oxide particle to sufficiently react with the metal compound having a hydrocarbon group before the heat treatment, the heat treatment may be performed during the drying treatment after the surface treatment, or separately after the drying treatment. From the viewpoint of appropriately performing the drying treatment, the heat treatment may be performed separately after the drying treatment.

From the viewpoints of developing high photocatalytic performance and improving dispersibility, the temperature of the heat treatment may be 180° C. or higher and 500° C. or lower, 200° C. or higher and 450° C. or lower, or 250° C. or higher and 400° C. or lower. From the viewpoints of developing high photocatalytic performance and improving dispersibility, the heat treatment time may be 10 minutes to 300 minutes, or 30 minutes to 120 minutes. When the heat treatment is performed during the surface treatment of the raw titanium oxide particle, the heat treatment at the aforementioned heating temperature may be performed after inducing the metal compound having a hydrocarbon group to sufficiently react with the raw titanium oxide particle at a temperature for the surface treatment mentioned above. When the heat treatment is performed after the drying treatment after the surface treatment, the temperature of the drying treatment is assumed to be the temperature for the heat treatment.

When the temperature for the heat treatment is 180° C. to 500° C., a titanium oxide particle that exhibits a high photocatalytic performance in the visible light range can be efficiently obtained. The heat treatment at 180° C. to 500° C. appropriately oxidizes the hydrocarbon group derived from the metal compound on the surface of the titanium oxide particle, and it is presumed that some of the C—C bonds or C═C bonds change into C—O bonds or C═O bonds.

The heat treatment may be performed in an atmosphere having an oxygen concentration (vol %) of 1% or more and 21% or less. When the heat treatment is performed in this oxygen atmosphere, oxidation of the hydrocarbon group derived from the metal compound on the surface of the titanium oxide particle can be appropriately and efficiently performed. The oxygen concentration (vol %) may be 3% or more and 21% or less, or may be 5% or more and 21% or less.

The method for the heat treatment may be any. A known heating method may be employed, such as heating by using an electric furnace, a baking furnace (a roller hearth kiln, a shuttle kiln, etc.), or a radiant heating furnace; and heating by using a laser beam, an infrared ray, UV, or a microwave.

The titanium oxide particle of the exemplary embodiment may be obtained through the above-described steps.

Composition for Forming Photocatalyst

A composition for forming a photocatalyst of an exemplary embodiment contains the titanium oxide particle of the exemplary embodiment, and at least one compound selected from the group consisting of a dispersion medium and a binder.

Examples of the form of the composition for forming a photocatalyst of the exemplary embodiment include a dispersion that contains the titanium oxide particle of the exemplary embodiment and a dispersion medium, and a composition that contains the titanium oxide particle of the exemplary embodiment and an organic or inorganic binder. The dispersion may be a paste that has a high viscosity.

The dispersion medium may be water, an organic solvent, or the like. Examples of the water include tap water, distilled water, and pure water. The organic solvent may be any, and examples thereof include hydrocarbon-based solvents, ester-based solvents, ether-based solvents, halogen-based solvents, and alcohol-based solvents. The dispersion may contain at least one compound selected from the group consisting of a dispersion medium and a surfactant from the viewpoints of dispersion stability and storage stability. The dispersion medium and the surfactant may be any know chemical substances. The dispersion may contain a binder as an emulsion.

The binder used in the composition may be any. Examples of the binder include organic binders such as fluororesin, silicone resin, polyester resin, acrylic resin, styrene resin, acrylonitrile/styrene copolymer resin, acrylonitrile/butadiene/styrene copolymer (ABS) resin, epoxy resin, polycarbonate resin, polyamide resin, polyamine resin, polyurethane resin, polyether resin, polysulfide resin, polyphenol resin, composites of the foregoing resins, and the foregoing resins subjected to silicone or halogen modification; and inorganic binders such as glass, ceramic, and metal powder.

The composition for forming a photocatalyst of the exemplary embodiment may further contain other components in addition to those described above. Examples of the other components include known additives such as a catalyst aid, a colorant, a filler, a preservative, a defoamer, an adhesion improver, and a thickener.

The composition for forming a photocatalyst of the exemplary embodiment may contain one titanium oxide particle of the exemplary embodiment or two or more titanium oxide particles of the exemplary embodiment.

The amount of the titanium oxide particle of the exemplary embodiment contained in the composition for forming a photocatalyst of the exemplary embodiment may be any and may be appropriately selected depending on the form, such as whether it is a dispersion, a resin composition, or the like, and the intended amount of the photocatalyst, etc.

The method for producing a photocatalyst by using the composition for forming a photocatalyst of the exemplary embodiment or the method for producing a structure that has a photocatalyst are not particularly limited. Any known application method id used. Examples of the application method include a spin coating method, a dip coating method, a flow coating method, a spray coating method, a roll coating method, a brush coating method, a sponge coating method, a screen printing method, and an inkjet printing method.

Photocatalyst and Structure

A photocatalyst of an exemplary embodiment contains the titanium oxide particle of the exemplary embodiment, or is formed of the titanium oxide particle of the exemplary embodiment. A structure of an exemplary embodiment includes the titanium oxide particle of the exemplary embodiment.

The photocatalyst of the exemplary embodiment may be a photocatalyst solely composed of the titanium oxide particle of the exemplary embodiment, a photocatalyst that contains the titanium oxide particle of the exemplary embodiment and a catalyst aid, or a photocatalyst prepared by compacting the titanium oxide particle into a desired shape by using an adhesive or a pressure-sensitive adhesive.

The structure according the exemplary embodiment may contain, as a photocatalyst, the titanium oxide particle of the exemplary embodiment. The structure of the exemplary embodiment may have the titanium oxide particle at least on the surface from the viewpoint of the photocatalytic activity.

The structure of the exemplary embodiment may be a structure that has the titanium oxide particle of the exemplary embodiment on at least part of a surface of a substrate, or may be a structure formed by applying the composition for forming a photocatalyst of the exemplary embodiment to at least part of a surface of a substrate. In this structure, the amount of the composition for forming a photocatalyst of the exemplary embodiment applied is not particularly limited, and may be selected as desired.

In the structure of the exemplary embodiment, the titanium oxide particle of the exemplary embodiment may be attached to the substrate surface or fixed to the substrate surface. From the viewpoint of durability of the photocatalyst, the titanium oxide particle may be fixed to the substrate surface. The fixing method may be any know method.

The substrate used in this exemplary embodiment may be any material irrespective of organic or inorganic, and may have any shape. Examples of the substrate include metals, ceramics, glass, plastics, rubber, rocks, cement, concrete, fibers, cloths, wood, paper, any combination of the foregoing, multilayer bodies containing any of the foregoing, and articles that have at least one coating layer on these materials. From the viewpoint of the usage, examples of the substrate include building materials, exterior materials, window frames, windowpanes, mirrors, tables, eating utensils, curtains, lenses, prisms, exteriors and paints for vehicles, exteriors of machineries, exteriors of articles, dustproof covers and paints, traffic signs, various display devices, advertising towers, sound insulation walls for roads, sound insulation walls for railroads, exteriors and paints for bridges and guardrails, tunnel interiors and paints, insulators, solar cell covers, solar water heater heat-collecting covers, polymer films, polymer sheets, filters, indoor signboards, outdoor signboards, covers for vehicle lights, outdoor lighting equipment, air purifiers, water purifiers, medical equipment, and nursing care products.

EXAMPLES

The exemplary embodiments of the present invention will now be described in detail through example which do not limit the scope of the present invention.

Example 1

A commercially available anatase titanium oxide particle (SSP-20 produced by SAKAI CHEMICAL INDUSTRY CO., LTD., volume-average particle diameter: 12 nm) is dispersed in toluene to prepare a dispersion. To the dispersion, 30 parts by mass of decyltrimethoxysilane is added dropwise relative to 100 parts by mass of the raw titanium oxide particle, and the resulting mixture is reacted for 1 hour at 80° C. Then the mixture is spray dried at a delivery temperature of 120° C. to obtain a dry powder. The dry powder is heat-treated in an electric furnace having an oxygen concentration (vol %) set to 12%, at 360° C. for 90 minutes to obtain a titanium oxide particle 1.

Comparative Example 1

A commercially available anatase titanium oxide particle (SSP-20 produced by SAKAI CHEMICAL INDUSTRY CO., LTD., volume-average particle diameter: 12 nm) is directly used as a titanium oxide particle C1.

Comparative Example 2

A commercially available anatase titanium oxide particle (SSP-20 produced by SAKAI CHEMICAL INDUSTRY CO., LTD., volume-average particle diameter: 12 nm) is heat-treated under the same conditions as in Example 1. As a result, a titanium oxide particle C2 is obtained.

Comparative Example 3

A titanium oxide particle C3 is obtained as in Example 1 except that the heat treatment is not conducted.

Comparative Examples 4 and 5

Titanium oxide particles C4 and C5 are obtained as in Example 1 except that the conditions for the heat treatment are changed as described in Table.

Examples 2 to 15

Titanium oxide particles 2 to 15 are obtained as in Example 1 except that the type and amount of the metal compound used in the surface treatment and the conditions for the heat treatment are changed as indicated in Table.

Example 21

A commercially available rutile titanium oxide particle (STR-100N produced by SAKAI CHEMICAL INDUSTRY CO., LTD., volume-average particle diameter: 16 nm) is dispersed in toluene to prepare a dispersion. To the dispersion, 30 parts by mass of decyltrimethoxysilane is added dropwise relative to 100 parts by mass of the raw titanium oxide particle, and the resulting mixture is reacted for 1 hour at 80° C. Then the mixture is spray dried at a delivery temperature of 120° C. to obtain a dry powder. The dry powder is heat-treated in an electric furnace having an oxygen concentration (vol %) set to 12%, at 360° C. for 90 minutes to obtain a titanium oxide particle 21.

Comparative Example 21

A commercially available rutile titanium oxide particle (STR-100N produced by SAKAI CHEMICAL INDUSTRY CO., LTD., volume-average particle diameter: 16 nm) is directly used as a titanium oxide particle C21.

Comparative Example 22

A commercially available rutile titanium oxide particle (STR-100N produced by SAKAI CHEMICAL INDUSTRY CO., LTD., volume-average particle diameter: 16 nm) is heat-treated under the same conditions as in Example 21 to obtain a titanium oxide particle C22.

Comparative Example 23

A titanium oxide particle C23 is obtained as in Example 21 except that the heat treatment is not conducted.

Comparative Examples 24 and 25

Titanium oxide particles C24 and C25 are obtained as in Example 21 except that the conditions for the heat treatment are changed as indicated in Table.

Measurement of Characteristics of Titanium Oxide Particles

An UV-visible absorption spectrum characteristic of each of the titanium oxide particles obtained above is confirmed. The titanium oxide particles of Examples 1 to 15 and 21 have absorption throughout the entire wavelength range of from 400 nm to 800 nm. In Table, the absorbances at wavelengths of 450 nm, 600 nm, and 750 nm relative to an absorbance 1 at a wavelength of 350 nm are indicated (indicated as "UV-Vis characteristic" in Table). The XPS spectrum of the carbon 1s orbital and the volume-average particle diameter (indicated as "D50v" in Table) are measured according to the aforementioned methods.

Performance Evaluation of Titanium Oxide Particle Photocatalyst Activity

The photocatalytic activity of the titanium oxide particle in the visible light range is evaluated as described below in terms of an ink decomposition property (change in chromaticity).

The titanium oxide particle obtained in each example is dispersed in water containing 4% by mass of methanol so that the solid concentration is 2% by mass to prepare a dispersion. The dispersion is sprayed toward a tile (5 cm square) and dried so that the titanium oxide particles are evenly attached to the tile surface. Next, a diluted ink prepared by diluting an ink for fountainpen (INK-30-R produced by PILOT Corporation) to 15 times its volume with a methanol/water (3:5) mixed solution is sprayed and dried to prepare a test piece.

The test piece immediately after completion of preparation is irradiated with visible light from a light-emitting diode (LED) that emits visible light (10,000 LX) having a wavelength of 400 nm to 800 nm (the absorption wavelength region (450 nm to 550 nm) of the ink is removed with a filter) continuously for 2 hours. During this process, a 5-yen coin is placed on a center portion of the irradiated surface of the test piece to form a shielded portion.

The chromaticity of the test piece immediately after completion of preparation and that of the test piece irradiated with visible light for 2 hours are measured with a spectral colorimeter (RM200QC produced by X-Rite Inc.), and $\Delta E1$ and $\Delta E2$ calculated from the equations below are determined. The chromaticity E is a value calculated from $E=\{(L^*)^2+(a^*)^2+(b^*)^2\}^{0.5}$ where $L^*$, $a^*$, and $b^*$ respectively represent coordinates of the $L^*a^*b^*$ color space.

$\Delta E1$=chromaticity of surface continuously irradiated with visible light for 2 hours—chromaticity of surface of test piece immediately after completion of preparation $\Delta E2$=chromaticity of shielded surface after irradiation with visible light for 2 hours—chromaticity of surface of test piece immediately after completion of preparation From $\Delta E1$ and $\Delta E2$, the decoloration change $\Delta E=\Delta E1-\Delta E2$ is determined, and the decomposition property is evaluated on the basis of $\Delta E$ as follows.

A: Good decomposition property
B: Fair decomposition property
C: Poor decomposition property Dispersibility Into a beaker, 0.05 g of the titanium oxide particle obtained in the example is placed, 40 g of methyl ethyl ketone is added thereto, and the resulting mixture is dispersed with an ultrasonic disperser for 10 minutes. Then the particle size distribution is measured with a Nanotrac UPA-ST (dynamic light-scattering particle size analyzer manufactured by Microtrac Bell Co., Ltd.), and the profile of the volume particle size distribution is classified as follows.

A: Good dispersibility with one peak in volume particle size distribution
B: Good enough dispersibility for practical application with two peaks in volume particle size distribution but the peak value of the main peak is at least 10 times that of the other peak
C: Poor dispersibility with three or more peaks in volume particle size distribution

TABLE

| | Core | Surface treatment Metal compound Type | Amount (parts by mass) | Heat treatment Temperature [°C] | Time (minutes) | Oxygen concentration [vol %] | D50v [nm] | XPS peak intensity ratio | UV-Vis characteristics 450 nm absorbance | 600 nm absorbance | 750 nm absorbance | Performance evaluation Photocatalytic activity | Dispersibility |
|---|---|---|---|---|---|---|---|---|---|---|---|---|---|
| Example 1 | Anatase titanium oxide | Decyltrimethoxysilane | 30 | 360 | 90 | 12 | 12 | 0.12 | 0.5 | 0.4 | 0.25 | A | A |
| Comparative Example 1 | Anatase titanium oxide | None | | | None | | 12 | 0.01 | 0 | 0 | 0 | C | C |
| Comparative Example 2 | Anatase titanium oxide | None | | 360 | 90 | 12 | 12 | 0.01 | 0 | 0 | 0 | C | C |
| Comparative Example 3 | Anatase titanium oxide | Decyltrimethoxysilane | 30 | | None | | 12 | 0.02 | 0 | 0 | 0 | C | A |
| Comparative Example 4 | Anatase titanium oxide | Decyltrimethoxysilane | 30 | 160 | 90 | 12 | 12 | 0.02 | 0.01 | 0 | 0 | C | A |
| Comparative Example 5 | Anatase titanium oxide | Decyltrimethoxysilane | 30 | 600 | 60 | 12 | 12 | 0.32 | 0.06 | 0.03 | 0.01 | C | C |
| Example 2 | Anatase titanium oxide | Isobutyltrimethoxysilane | 30 | 360 | 90 | 12 | 12 | 0.06 | 0.53 | 0.41 | 0.27 | A | A |
| Example 3 | Anatase titanium oxide | Hexyltrimethoxysilane | 30 | 360 | 90 | 12 | 12 | 0.1 | 0.55 | 0.38 | 0.24 | A | A |
| Example 4 | Anatase titanium oxide | Decyltrimethoxysilane | 30 | 500 | 90 | 12 | 12 | 0.25 | 0.34 | 0.2 | 0.11 | A | B |
| Example 5 | Anatase titanium oxide | Decyltrimethoxysilane | 30 | 450 | 90 | 12 | 12 | 0.19 | 0.42 | 0.3 | 0.22 | A | A |
| Example 6 | Anatase titanium oxide | Decyltrimethoxysilane | 30 | 180 | 90 | 12 | 12 | 0.03 | 0.19 | 0.14 | 0.1 | B | B |
| Example 7 | Anatase titanium oxide | Decyltrimethoxysilane | 30 | 250 | 120 | 12 | 12 | 0.05 | 0.28 | 0.16 | 0.1 | A | A |
| Example 8 | Anatase titanium oxide | Decyltrimethoxysilane | 30 | 360 | 90 | 12 | 12 | 0.1 | 0.52 | 0.42 | 0.26 | A | A |
| Example 9 | Anatase titanium oxide | Decyltrimethoxysilane | 50 | 360 | 90 | 12 | 12 | 0.15 | 0.28 | 0.12 | 0.08 | A | B |
| Example 10 | Anatase titanium oxide | Decyltrimethoxysilane | 25 | 360 | 90 | 12 | 12 | 0.13 | 0.35 | 0.24 | 0.12 | A | A |
| Example 11 | Anatase titanium oxide | Phenyltrimethoxysilane | 30 | 360 | 90 | 12 | 12 | 0.04 | 0.58 | 0.39 | 0.24 | B | A |
| Example 12 | Anatase titanium oxide | Hexamethyldisilazane | 50 | 360 | 90 | 12 | 12 | 0.08 | 0.28 | 0.1 | 0.06 | A | A |
| Example 13 | Anatase titanium oxide | Acetoalkoxyaluminum diisopropylate | 30 | 360 | 90 | 12 | 12 | 0.09 | 0.25 | 0.09 | 0.05 | A | A |
| Example 14 | Anatase titanium oxide | Isopropyltriisostearoyl titanate | 30 | 360 | 90 | 5 | 12 | 0.05 | 0.33 | 0.22 | 0.12 | A | A |
| Example 15 | Anatase titanium oxide | Isobutyltrimethoxysilane | 30 | 360 | 90 | 20 | 12 | 0.07 | 0.45 | 0.28 | 0.18 | A | A |
| Example 21 | Rutile titanium oxide | Decyltrimethoxysilane | 30 | 360 | 90 | 12 | 16 | 0.14 | 0.5 | 0.33 | 0.22 | A | C |
| Comparative Example 21 | Rutile titanium oxide | None | | | None | | 16 | 0.01 | 0 | 0 | 0 | C | C |
| Comparative Example 22 | Rutile titanium oxide | Decyltrimethoxysilane | 30 | 360 | 90 | 12 | 16 | 0.01 | 0 | 0 | 0 | C | C |
| Comparative Example 23 | Rutile titanium oxide | Decyltrimethoxysilane | 30 | | None | | 16 | 0.02 | 0 | 0 | 0 | C | A |
| Comparative Example 24 | Rutile titanium oxide | Decyltrimethoxysilane | 30 | 160 | 90 | 12 | 16 | 0.02 | 0 | 0 | 0 | C | A |
| Comparative Example 25 | Rutile titanium oxide | Decyltrimethoxysilane | 30 | 600 | 60 | 12 | 16 | 0.34 | 0.01 | 0 | 0 | C | C |

The details of the metal compounds in Table are as follows:
Acetoalkoxyaluminum diisopropylate: PLENACT AL-M produced by Ajinomoto Fine-Techno Co., Inc.
Isopropyltriisostearoyl titanate: PLENACT TTS produced by Ajinomoto Fine-Techno Co., Inc.

The results of the performance evaluation indicated in Table illustrate that Examples have superior photocatalytic activity in the visible light range compared to Comparative Examples. Moreover, Examples maintain dispersibility.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide particle comprising:
    a metal compound having a metal atom and a carbon atom and being bonded to a surface through an oxygen atom,
    wherein the titanium oxide particle has absorption at a wavelength of 450 nm and a wavelength of 750 nm in a visible absorption spectrum, and
    the titanium oxide particle satisfies the following relationship:

$$0.03 \le A \le 0.3$$

where A represents a value of {(peak intensity of C—O bond+peak intensity of C=O bond)/(peak intensity of C—C bond+peak intensity of C=C bond)} in an XPS spectrum of a carbon 1s orbital.

2. The titanium oxide particle according to claim 1, wherein the metal compound has the carbon atom directly bonded to the metal atom.

3. The titanium oxide particle according to claim 1, wherein the titanium oxide particle has absorption throughout an entire wavelength range of from 400 nm to 800 nm, in the visible absorption spectrum.

4. The titanium oxide particle according to claim 1, wherein the metal atom is a silicon atom.

5. The titanium oxide particle according to claim 1, wherein the titanium oxide particle has a volume-average particle diameter in a range of from 10 nm to 1 μm.

6. The titanium oxide particle according to claim 1, wherein the value of A is in a range of from 0.04 to 0.25.

7. The titanium oxide particle according to claim 1, wherein the value of A is in a range of from 0.05 to 0.20.

8. The titanium oxide particle according to claim 1, wherein the carbon atom is contained in a saturated or unsaturated aliphatic hydrocarbon group having 1 or more and 20 or less carbon atoms, or in an aromatic hydrocarbon group.

9. The titanium oxide particle according to claim 1, wherein the carbon atom is contained in a saturated aliphatic hydrocarbon group.

10. A method for producing the titanium oxide particle according to claim 1, the method comprising:
    surface-treating a raw titanium oxide particle with a metal compound having a metal atom and a hydrocarbon group; and
    performing a heat treatment during or after the surface-treating of the raw titanium oxide particle.

11. The method according to claim 10, wherein the metal compound is a metal compound having a metal atom and a hydrocarbon group directly bonded to the metal atom.

12. The method according to claim 10, wherein the metal atom is a silicon atom.

13. The method according to claim 10, wherein the hydrocarbon group is a saturated or unsaturated aliphatic hydrocarbon group having 1 or more and 20 or less carbon atoms, or an aromatic hydrocarbon group.

14. The method according to claim 10, wherein the hydrocarbon group is a saturated aliphatic hydrocarbon group having 1 or more and 20 or less carbon atoms.

15. The method according to claim 10, wherein the hydrocarbon group is a saturated aliphatic hydrocarbon group having 4 or more and 10 or less carbon atoms.

16. A composition for forming a photocatalyst, comprising:
    the titanium oxide particle according to claim 1; and
    at least one compound selected from the group consisting of a dispersion medium and a binder.

* * * * *